(12) United States Patent
Murphree et al.

(10) Patent No.: US 9,719,347 B2
(45) Date of Patent: Aug. 1, 2017

(54) FLOW ELECTRIFICATION SENSOR

(71) Applicant: Halliburton Energy Services, Inc., Houston, TX (US)

(72) Inventors: Zachary Ryan Murphree, Dallas, TX (US); Michael Linley Fripp, Carrollton, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 277 days.

(21) Appl. No.: 14/394,372

(22) PCT Filed: Dec. 16, 2013

(86) PCT No.: PCT/US2013/075279
§ 371 (c)(1),
(2) Date: Oct. 14, 2014

(87) PCT Pub. No.: WO2015/094147
PCT Pub. Date: Jun. 25, 2015

(65) Prior Publication Data
US 2016/0258290 A1    Sep. 8, 2016

(51) Int. Cl.
*E21B 49/08* (2006.01)
*E21B 47/10* (2012.01)
*E21B 43/12* (2006.01)
*E21B 43/38* (2006.01)
*G01V 3/18* (2006.01)

(52) U.S. Cl.
CPC .............. *E21B 49/08* (2013.01); *E21B 43/12* (2013.01); *E21B 43/38* (2013.01); *E21B 47/10* (2013.01); *E21B 49/087* (2013.01); *G01V 3/18* (2013.01); *E21B 2049/085* (2013.01)

(58) Field of Classification Search
CPC .......... E21B 49/08; E21B 43/12; E21B 43/38; E21B 47/10; E21B 49/087; E21B 2049/085; G01V 3/18
See application file for complete search history.

(56) References Cited

U.S. PATENT DOCUMENTS

| 4,129,501 A | 12/1978 | Haynes |
| 4,382,231 A | 5/1983 | Miller |
| 7,479,864 B2 | 1/2009 | Weller et al. |

(Continued)

OTHER PUBLICATIONS

Zhu et al., Experimental Study on Measurement Method of Flow Electrification, 2010, Trans Tech Publications, Switzerland, www.scientific.net/AMM.43.303.

(Continued)

*Primary Examiner* — Yong-Suk (Philip) Ro
(74) *Attorney, Agent, or Firm* — McDermott Will & Emery LLP

(57) ABSTRACT

Flow electrification sensors and methods relating thereto may be useful in characterizing fluids, especially the in situ characterization of fluids produced during oil and gas production operations. A system may include a flow path; a flow electrification sensor at least partially contained within the flow path, the flow electrification sensor comprising a static charge accumulator and an insulator arranged such that the static charge accumulator interacts with a fluid in the flow path; a reference sensor; and a signal processor communicably coupled to the flow electrification sensor and the reference sensor.

20 Claims, 2 Drawing Sheets

(56) References Cited

U.S. PATENT DOCUMENTS

| | | |
|---|---|---|
| 2004/0206492 A1 | 10/2004 | Skalski et al. |
| 2007/0114372 A1 | 5/2007 | Lievois et al. |
| 2009/0101329 A1 | 4/2009 | Clem et al. |
| 2011/0210645 A1* | 9/2011 | Mason ................ E21B 41/0085 310/309 |

OTHER PUBLICATIONS

Reppermund et al., "Hazards of 'Static Accumulation;' Flammable Liquids," Paper presented at SCHC Spring 2009 Meeting, Houston, TX, Apr. 7-8, 2009.

International Search Report and Written Opinion for PCT/US2013/075279 dated Sep. 15, 2014.

\* cited by examiner

FLOW ELECTRIFICATION SENSOR

BACKGROUND

The present disclosure generally relates to flow electrification sensors and methods relating thereto for characterizing fluids.

In the oil and gas industry, it may be desirable to know the composition of a produced fluid from a subterranean formation. Water (e.g., naturally occurring or introduced during exploration and stimulation operation) often co-exists with crude oil and other hydrocarbons in subterranean formations. As such, both substances are often produced together at the surface of a working oil well. To produce a valuable hydrocarbon stream, the water portion should be separated from the hydrocarbons, usually at a downstream location remote from the well site. Handling this produced water represents a significant expense in producing, separating, and disposal. Minimizing such expenses would be desirable.

In some instances, it may be desirable to perform operations that maximize hydrocarbon production and reduce water production. As an example of such an operation, a sealing or conformance method could be performed at a portion of a subterranean formation producing high concentrations of water to prevent migration of that water into the hydrocarbon production stream. Having the ability to predict and then address the production stream in such a way would be highly desirable.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
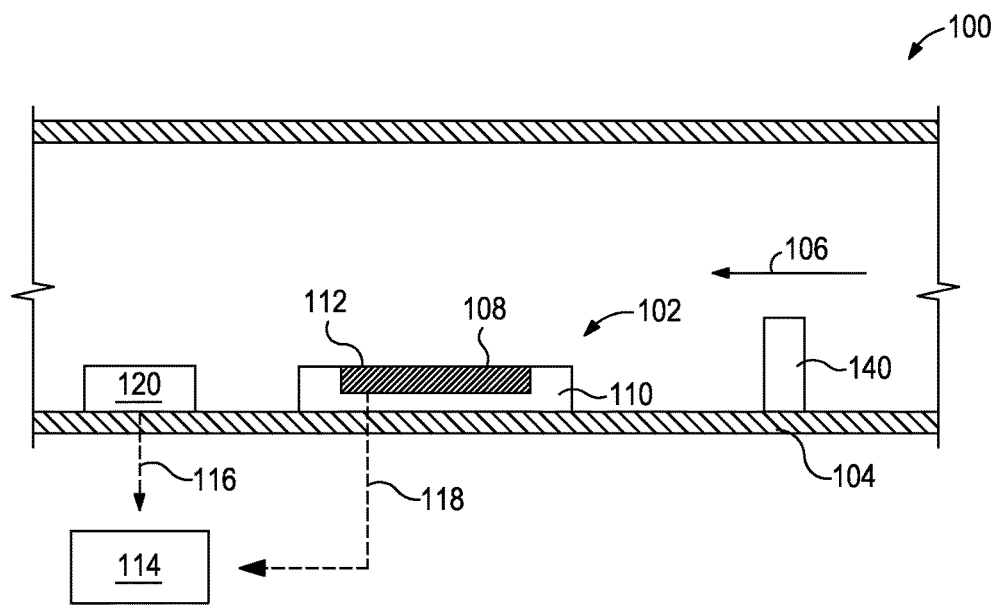
FIG. 1 provides an illustration of a system or portion thereof described herein that includes a flow electrification sensor arranged within a flow path, according to one or more embodiments described herein.

The present disclosure generally relates to flow electrification sensors and methods relating thereto for characterizing fluids.

The flow electrification sensors described herein use a triboelectric effect to measure the electrical conductivity of a fluid. Generally, the triboelectric effect refers to a contact electrification where a first material (e.g., a portion of a flow electrification sensor) becomes electrically charged as a result of friction with a second material (e.g., a fluid). The amount of electrical charge that builds up in the first material depends on, inter alia, the conductivity and velocity of the fluid. Generally, fluids with higher conductivity (e.g., brines as compared to hydrocarbons) build up less charge because the conductivity of the fluid acts to dissipate the charge in the first material.

Thus, by examining the electrical conductivity of a fluid through these flow electrification sensors, one can determine whether the composition of the fluid is more aqueous-based or hydrocarbon-based. In some embodiments where the electrical conductivity of the fluid indicates that the fluid is aqueous-based, if desired, advantageously an operation could be performed to seal that portion of the formation to reduce the amount of fluids being produced from that portion. In some instances, the flow electrification sensors described herein may be used for qualitative analysis of the composition of fluids flowing through a flow path. For example, the electrical potential accumulation in a flow electrification sensor may, in some embodiments, be monitored over a period of time and changes in the electrical potential may indicate a change in the fluid composition (e.g., increased water or brine concentration with a decrease in the electrical potential). Accordingly, remedial actions may be taken to maximize hydrocarbon production (e.g., a conformance operation).

In some instances, multiple flow electrification sensors described herein may be positioned axially along a flow path within a wellbore penetrating a subterranean formation to be upstream of individual production zones in the formation. Correlating the electrical potential accumulation in each of the flow electrification sensors with their location along the wellbore may allow for water-producing zones to be identified. Remediation operations to address the water-producing zones can then be conducted if desired (e.g., with zonal isolation or a conformance operation).

Additionally, in some instances, the potential energy accumulated by the flow electrification sensors may be used to power the sensors themselves, which may reduce the need for a battery or other power system. As batteries and other power systems generally increase weight and size of sensors, the ability for the flow electrification sensors described to produce most, and in some instances all, the energy required for operation may be particularly advantageous for implementation in wellbore systems where both weight and size are preferably minimized.

FIG. 1 provides an illustration of a system 100 or portion thereof that includes a flow electrification sensor 102 arranged within the flow path 104, according to one or more embodiments described herein. As used herein, the term "flow path" refers to a route through which a fluid is capable of being transported between two points. In some embodiments, the flow path may not be continuous or contiguous between the two points. Exemplary flow paths include, but are not limited to, a mixing tank, a flowline, a pipeline, a conduit, a wellbore annulus (e.g., an annulus between a casing and a wellbore or an annulus between a screen and a wellbore), a drill pipe, a casing, a liner, a liner string, a hose, a mixer, a pump, a process facility, a storage vessel, a tanker, a railway tank car, a transport barge or ship, a separator, a process vessel, and the like, any hybrid thereof, and any combination thereof. In cases where the flow path is a pipeline, or the like, the pipeline may be a pre-commissioned pipeline or an operational pipeline. It should be noted that the term "flow path" does not necessarily imply that a fluid is flowing therein, rather, that a fluid is capable of being transported or otherwise flowable therethrough. In some embodiments, a flow path may be a component of a more complex system, for example, skids, trucks, pumps, and the like. In some embodiments, a flow path may comprise more than one section that is separated, but still fluidly communicable, by apparatuses like valves, flow meters, and the like.

In some embodiments, the flow electrification sensor 102 may include a static charge accumulator 108 and an insulator 110. The static charge accumulator 108 may be constructed of any dielectric material capable of accumulating an electric charge as a result of the fluid 106 flowing over and interacting with the static charge accumulator 108. The insulator 110 may insulate the static charge accumulator 108 from other dielectric materials that could contribute to a reading or signal from the flow electrification sensor 102. Further, the insulator 110 may prevent unwanted discharge of the static charge accumulator 108.

Examples of materials suitable for use in constructing the static charge accumulator 108 may include, but are not limited to, insulating polymers (e.g., polyether ether ketone ("PEEK") and TEFLON® (polytetrafluoroethylene, available from DuPont)), synthetic plastics, elastomers, silicons, rubbers, carbon fiber materials, polyvinyl chloride ("PVC"), polyurethane, polyethelene, carbon fiber vinyl, glass, porcelain, ceramic, poly(p-xylylene) polymers (e.g., PARYLENE™ available from Parylene Engineering), and the like, and any combination thereof. Additionally, while depicted as a single solid material, in other embodiments, the static charge accumulator 108 may be comprised of one or more layers of materials. Moreover, the static charge accumulator 108 may also be comprised of multiple static charge accumulators 108 combined or otherwise coupled together and acting as a single static charge accumulator 108, possibly resulting in a larger charge accumulation due to greater surface area and interaction with the fluid 106.

Materials suitable for use in constructing the insulator 110 may include materials with a high dielectric permittivity. Examples of materials suitable for use in constructing the insulator 110 may include, but are not limited to, a piezoelectric material, a ferroelectric material, an electret material, an electrostrictor material, any other capacitive material, and the like, and any combination thereof.

The static charge accumulator 108 and the insulator 110 may have any suitable configuration including having the insulator 110 interpose the static charge accumulator 108 and the flow path 104, as illustrated. Further, in some embodiments, the insulator 110 may extend around the ends of the static charge accumulator 108, thereby leaving only a single face 112 of the static charge accumulator 108 exposed to the fluid 106. Such a configuration may advantageously further isolate the static charge accumulator 108 from other dielectric materials that could contribute to a reading or signal from the sensor 102. The flow electrification sensor 102 may be coupled or mechanically-fastened to the interior of flow path 104 using any suitable technique, for example, one or more mechanical fasteners, adhesives, welding, brazing, heat shrinking, and the like, and any combination thereof.

One skilled in the art would readily recognize other configurations for the static charge accumulator 108 and the insulator 110 and the arrangement of the flow electrification sensor 102 in the flow path 104. For example, in alternate embodiments, the static charge accumulator 108 may be arranged within the wall of a flow path 104 (not shown) where the insulator 110 is the flow path 104. In other embodiments, the flow electrification sensor 102 may not be coupled to the flow path 104 but rather arranged within the flow path 104 (e.g., on a wireline).

In some embodiments, interaction between the flow electrification sensor 102 and a fluid 106 flowing through the flow path 104 may cause charge to build-up (i.e., electrical potential to accumulate) in the static charge accumulator 108. In some embodiments, the flow electrification sensor 102 may produce a sensor output signal 118 (e.g., a voltage or a current) corresponding to the accumulated electric potential in the static charge accumulator 108, which is a measure of the conductivity of the fluid 106. In some embodiments, the flow electrification sensor 102 may be communicably coupled (wired or wirelessly) to a signal processor 114 (e.g., a computer including a non-transitory machine-readable medium) for reading and analyzing the sensor output signal 118. In some embodiments, the sensor output signal 118 may be compared to a reference output signal 116 corresponding to the electric potential of a reference measured by a reference sensor 120, thereby producing a fluid conductivity measurement. In some embodiments, the reference output signal 116 may correspond to the electrical potential of the fluid 106. In some embodiments, the reference output signal may be from a ground reference (not shown). One skilled in the art would readily recognize other references suitable for use in the embodiments described herein.

The magnitude of the electrical potential accumulated by the static charge accumulator 108 and of the corresponding sensor output signal 118 may depend on, inter alia, the static charge accumulator 108 material, the surface area of the static charge accumulator 108, the composition of the fluid 106, and the velocity of the fluid 106.

In some embodiments, a vortex generator or turbulator 140 may be included upstream of the flow electrification sensor 102 to induce or enhance turbulence in the fluid 106, which may increase the magnitude of the electrical potential accumulated by the static charge accumulator 108. Examples of turbulators 140 may include, but are not limited to, inflow control devices, twisted-tape turbulators, brock turbulators, wire turbulators, static mixers, flow upsets, and the like, and any combination thereof.

In some embodiments, the fluid conductivity measurements described herein may be qualitative. For example, two or more fluid conductivity measurements may be compared (e.g., from different locations in the flow path or at different time points) where changes or differences in the fluid conductivity measurements may indicate a change or difference in the composition of the fluid.

In some embodiments (not shown), more than one flow electrification sensor 102 may be arranged within a flow path 104 along the length of the flow path 104, along the circumference of the flow path 104, or both. In some instances, the fluid conductivity measurements derived from each flow electrification sensor 102 and the corresponding location may be useful in determining if fluid stratification is occurring along the length of the flow path 104, along the cross-section of the flow path 104, or both. For example, in one embodiment, a section of a tubular may contain up to about 16 flow electrification sensors 102, and as many sections of the tubular as there are zones of interest.

Figure 2:
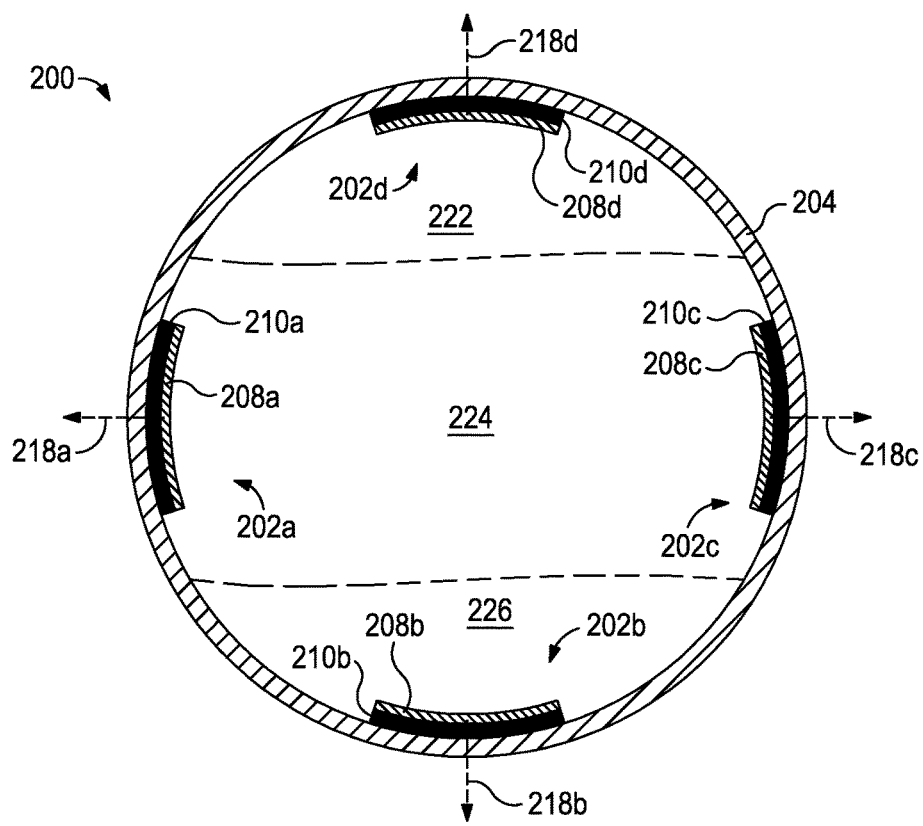
FIG. 2 provides an illustration of a system or portion thereof described herein that includes four flow electrification sensors arranged along the circumference of and within a flow path, according to one or more embodiments described herein.

FIG. 2 provides an illustration of a portion of a system 200 that includes four flow electrification sensors 202a-d arranged along the circumference of (i.e., circumferentially offset) and within a flow path 204, according to one or more embodiments described herein. Each of the flow electrification sensors 202a-d includes a static charge accumulator 208a-d and an insulator 210a-d. The fluid in the flow path 204 may include several components that separate (e.g., gas 222, hydrocarbon 224, and brine or water 226). Comparing a sensor output signal 218a-d for each of the flow electrification sensors 202a-d may provide an indication that the fluid in the flow path has separated and the composition of the striations of the separated fluid. For example, the gas 222 that interacts with the flow electrification sensor 202*d* may yield a higher sensor output signal 218*d* than the sensor output signals 218*a,c* corresponding to a hydrocarbon 224 interacting with the flow electrification sensors 202*a,c*, which may both be higher than the sensor output signal 218*b* corresponding to the brine or water 226 interacting with the flow electrification sensors 202*b*. In some instances when fluid separation is observed, remedial action may be taken (e.g., increasing the pressure drop across the zone by choking an inflow control device or remedially blocking flow with a conformance operation). In some instances where fluid separation is desired, the fluid separation may be facilitated by using larger diameter tubing.

Figure 3:
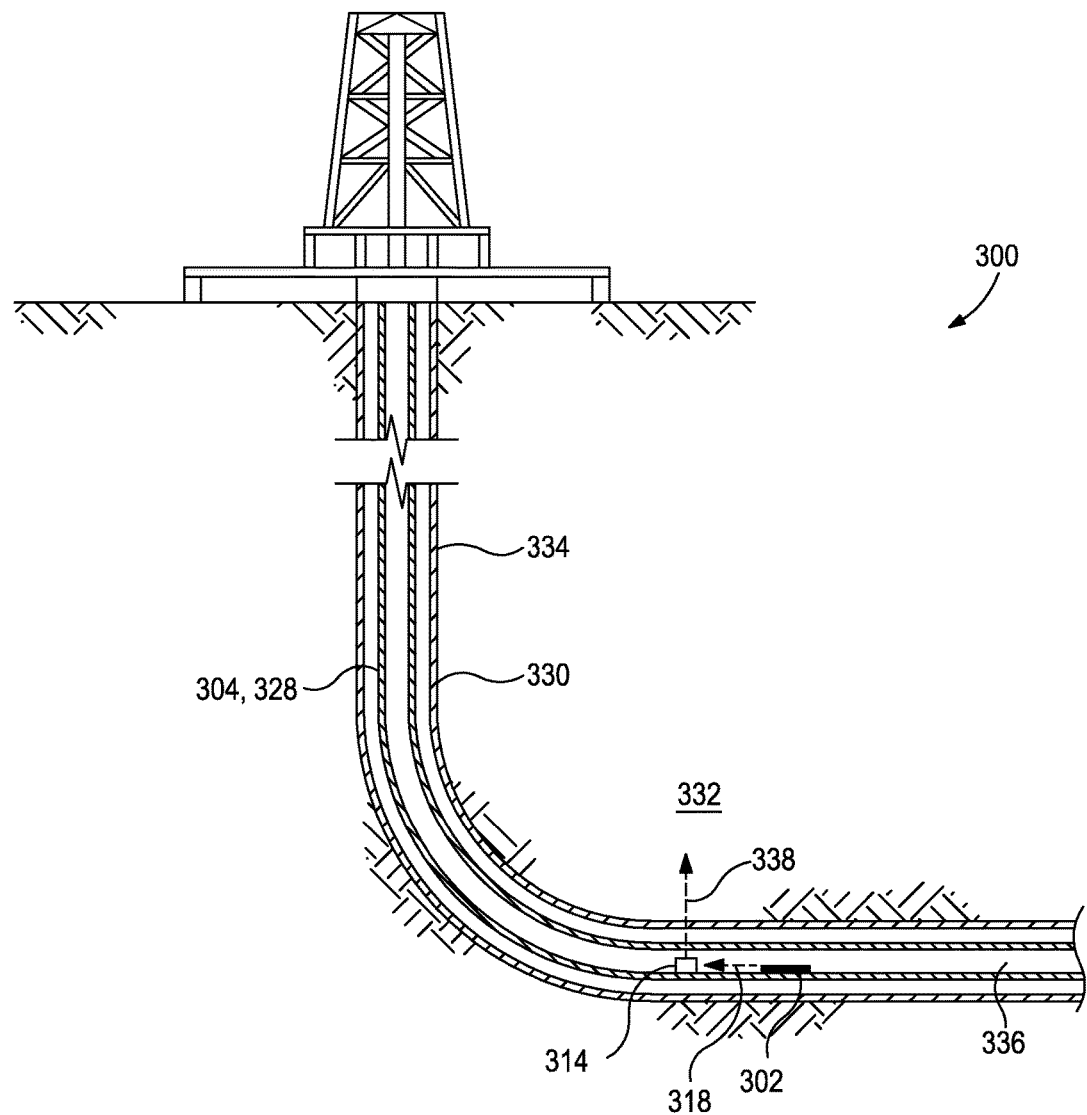
FIG. 3 provides an illustration of a system or portion thereof described herein that includes a flow electrification sensor arranged within a flow path, which includes a tubular in a wellbore penetrating a subterranean formation, according to one or more embodiments described herein.

FIG. 3 provides an illustration of a system 300 or portion thereof that includes a flow electrification sensor 302 arranged within a flow path 304, which includes a tubular 328 in a wellbore 330 penetrating a subterranean formation 332, according to one or more embodiments described herein. The wellbore includes casing 334. It should be noted that while FIG. 3 generally depicts a land-based system, those skilled in the art will readily recognize that the principles described herein are equally applicable to subsea operations that employ floating or sea-based platforms and rigs, without departing from the scope of the disclosure.

In the system 300, the flow electrification sensor 302 interacts with a fluid 336 flowing in the tubular 328. Similar to the description of FIG. 1 above, a sensor output signal 318 from the flow electrification sensor 302 may be communicated to a signal processor 314, which in FIG. 3 is illustrated as being coupled to the tubular 328. The signal processor 314 may compare the sensor output signal 318 to a reference (not shown) and relay (wired or wirelessly) the resultant fluid conductivity measurement 338 to the surface.

One of skill in the art will readily recognize other configurations for the systems described herein that include at least one flow electrification sensor within a flow path.

In some embodiments, a flow electrification sensor may be coupled directly to the casing.

In some embodiments, a flow path in which a flow electrification sensor is disposed may be a portion of a wellbore tool (e.g., a packer or a screen), and the flow electrification sensor may optionally be coupled thereto.

In some embodiments, a system may include a plurality of flow electrification sensors axially offset along a flow path. In some instances, the flow electrification sensors may be positioned upstream of individual production zones in the formation. Correlating the electrical potential accumulation in each of the flow electrification sensors with location along the wellbore may, in some embodiments, allow for water-producing zones to be identified and remediated.

In some embodiments, remediating water-producing zones may include a chemical conformance treatment, a mechanical conformance treatment, or both. In some embodiments, chemical conformance treatments may include treating portions of the subterranean formation with either sealants, relative permeability modifiers, or both. In some embodiments, mechanical conformance may include closing or restricting flow from the formation to the wellbore at one or more zones via a flow control device located in a wellbore completion assembly. In some embodiments, mechanical conformance may include closing or restricting flow from the formation to the wellbore at one or more zones by installing a straddle-packer or a bridge plug.

In general, it is recognized that the various embodiments herein directed to computers and computer control, including various blocks, modules, elements, components, methods, and algorithms, can be implemented using computer hardware, software, combinations thereof, and the like. To illustrate this interchangeability of hardware and software, various illustrative modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Embodiments disclosed herein include:

A. a system that includes a flow path; a flow electrification sensor at least partially contained within the flow path, the flow electrification sensor comprising a static charge accumulator and an insulator arranged such that the static charge accumulator interacts with a fluid in the flow path; a reference sensor; and a signal processor communicably coupled to the flow electrification sensor and the reference sensor;

B. a method that includes flowing a fluid through a flow path and over a flow electrification sensor at least partially contained within the flow path, the flow electrification sensor comprising a static charge accumulator and an insulator arranged such that the static charge accumulator interacts with the fluid; accumulating an electrical potential on the static charge accumulator; generating a sensor output signal corresponding to the electrical potential of the static charge accumulator; generating a reference output signal corresponding to an electrical potential of a reference; receiving the sensor output signal and the reference output signal with a signal processor; and comparing the sensor output signal and the reference output signal; and C. a method that includes flowing a fluid through a flow path and a first and a second flow electrification sensor at least partially contained within the flow path, each flow electrification sensor comprising a static charge accumulator and an insulator arranged such that the static charge accumulator interacts with the fluid, wherein the flow path extends into a wellbore penetrating a subterranean formation, and wherein the first flow electrification sensor is located along the flow path upstream of a first producing portion of the subterranean formation and downstream of a second producing portion of the subterranean formation, and wherein the second flow electrification sensor is located along the flow path upstream of the first producing portion of the subterranean formation and the second producing portion of the subterranean formation; accumulating an electrical potential on the static charge accumulator of each of the first and the second flow electrification sensors; generating a first and a second sensor output signal corresponding to the electrical potential of the static charge accumulator of the first and the second flow electrification sensors, respectively; generating a reference output signal corresponding to an electrical potential of the fluid; receiving the first and second sensor output signals and the reference output signal with a signal processor; comparing the first sensor output signal and the reference output signal, thereby producing a first fluid conductivity measurement; comparing the second sensor output signal and the reference output signal, thereby producing a second fluid conductivity measurement; and comparing the first fluid conductivity measurement and the second fluid conductivity measurement.

Each of Embodiments A, B, and C may have one or more of the following additional elements in any combination (unless already provided for): Element 1: wherein the flow path is at least partially formed by the insulator; Element 2: wherein the reference sensor is coupled to a ground; Element 3: wherein the reference sensor analyzes the fluid; Element 4: wherein the flow path comprises a tubular in a wellbore penetrating a subterranean formation; Element 5: wherein the flow path comprises a portion of a wellbore tool; Element 6: Element 5 wherein the flow electrification sensor is coupled to the wellbore tool; Element 7: wherein the flow path comprises a casing disposed in a wellbore penetrating a subterranean formation, and wherein the flow electrification sensor is coupled to the casing; Element 8: wherein the flow electrification sensor is a first flow electrification sensor, and wherein the system further comprises a second flow electrification sensor or wherein the flow path at least partially contains the second flow electrification sensor; Element 9: Element 6 wherein the first and second flow electrification sensors are axially offset along the flow path; Element 10: Element 6 wherein the first and second flow electrification sensors are circumferentially offset within the flow path; Element 11: wherein a turbulator a vortex generator is arranged within the flow path upstream of the flow electrification sensor; Element 12: wherein the static charge accumulator comprises at least one of: an insulating polymer (e.g., polyether ether ketone and TEFLON® (polytetrafluoroethylene, available from DuPont)), a synthetic plastic, an elastomer, a silicon, a rubber, a carbon fiber material, polyvinyl chloride, polyurethane, polyethelene, carbon fiber vinyl, glass, porcelain, ceramic, a poly(p-xylylene) polymer (e.g., PARYLENE™ available from Parylene Engineering), and any combination thereof; and Element 13: wherein the insulator comprises at least one of: a piezoelectric material, a ferroelectric material, an electret material, an electrostrictor material, any other capacitive material, and any combination thereof.

By way of non-limiting example, exemplary combinations applicable to Embodiments A, B, and C include: Element 2 or 3 in combination with Element 1; Element 2 or 3 in combination with Element 4 and optionally Element 1; Element 2 or 3 in combination with Element 5 and optionally Element 6; Element 2 or 3 in combination with Element 7; Elements 5-8 in combination and optionally in combination Element 9; Elements 7 and 8 in combination with Element 9 or 10; at least one of Elements 11-13 in combination with any of the foregoing; and at least one of Elements 11-13 in combination with one of Elements 1-10.

Further, Embodiment B may have one or more of the following additional elements in any combination (unless already provided for): Element 14: wherein the sensor output signal and the reference output signal are voltages; Element 15: wherein the sensor output signal and the reference output signal are currents; Element 16: wherein the reference is the fluid; Element 17: wherein the flow electrification sensor is a first flow electrification sensor, wherein comparing the sensor output signal and the reference output signal produces a first fluid conductivity measurement, and wherein method further comprises: flowing a fluid through a flow path and over a second flow electrification sensor at least partially contained within the flow path, the flow electrification sensor comprising a second static charge accumulator and a second insulator arranged such that the second static charge accumulator interacts with the fluid; accumulating an electrical potential on the second static charge accumulator; generating a second sensor output signal corresponding to the electrical potential of the second static charge accumulator; receiving the second sensor output signal with the signal processor; comparing the second sensor output signal and the reference output signal, thereby producing a second fluid conductivity measurement; and comparing the first fluid conductivity measurement and the second fluid conductivity measurement; Element 18: Element 17 wherein the flow path comprises a portion of a wellbore penetrating a subterranean formation; Element 19: Element 18 further including monitoring the comparison of the sensor output signal and the reference output signal over a period of time; and Element 20: Element 19 further including performing a remedial operation to a portion of the subterranean formation in response to a change in the comparison of the sensor output signal and the reference output signal over the period of time.

By way of non-limiting example, exemplary combinations applicable to Embodiment B include: at least one of Elements 14-20 in combination with at least one of Elements 1-13 (including the aforementioned combinations relating to Elements 1-13); Element 14 or 15 in combination with Elements 17-19 and optionally Element 20; and Element 3 in combination with Element 16 optionally including Element 3 combination described above and optionally in combination with Element 14 or 15.

Further, Embodiment C may have one or more of the following additional elements in any combination (unless already provided for): Element 14: wherein the sensor output signal and the reference output signal are voltages; Element 15: wherein the sensor output signal and the reference output signal are currents; Element 21: monitoring over a period of time the comparison of the first fluid conductivity measurement and the second fluid conductivity measurement; and Element 22: performing a remedial operation to at least one of the first and second portions of the subterranean formation based on the comparison of the first fluid conductivity measurement and the second fluid conductivity measurement.

By way of non-limiting example, exemplary combinations applicable to Embodiment C include: at least one of Elements 14-15 and 21-22 in combination with at least one of Elements 1-13 (including the aforementioned combinations relating to Elements 1-13); and Element 21 in combination with Element 22 and optionally in combination with Element 14 or 15.

To facilitate a better understanding of the embodiments of the present invention, the following examples of preferred or representative embodiments are given. In no way should the following examples be read to limit, or to define, the scope of the invention.

EXAMPLES

A refined oil was pumped between two barrels through a plastic hose with a hand pump. A first lead was attached to a hose clamp affixed (the reference ground) to the plastic hose, and a second lead was attached to a piece of aluminum foil wrapped around the plastic hose (the static charge accumulator). The voltage readout visually observed on the oscilloscope spiked as the oil was pumped between barrels corresponding to pump strokes. Additionally, when air was pumped through the plastic tubing a voltage was observed visually, but having a smaller magnitude than that produced with the oil. This example empirically demonstrates that the flow electrification sensors may be useful in quantitatively or qualitatively analyzing the composition of a flowing fluid interacting with the sensors to indicate the type of fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The invention claimed is:

1. A system, comprising:
   a flow path;
   a flow electrification sensor at least partially contained within the flow path, the flow electrification sensor comprising a static charge accumulator and an insulator arranged such that the static charge accumulator interacts with a fluid in the flow path;
   a reference sensor that is configured to provide an electrical potential of the fluid or of a ground; and
   a signal processor communicably coupled to the flow electrification sensor and the reference sensor.

2. The system of claim 1, wherein the flow path is at least partially formed by the insulator.

3. The system of claim 1, wherein the reference sensor is coupled to the ground and is configured to provide the electrical potential of the ground.

4. The system of claim 1, wherein the reference sensor is configured to provide the electrical potential of the fluid.

5. The system of claim 1, wherein the flow path comprises a tubular in a wellbore penetrating a subterranean formation.

6. The system of claim 1, wherein the flow electrification sensor is a first flow electrification sensor, and wherein the system further comprises a second flow electrification sensor.

7. The system of claim 6, wherein the first and second flow electrification sensors are axially offset along the flow path.

8. The system of claim 6, wherein the first and second flow electrification sensors are circumferentially offset within the flow path.

9. The system of claim 1 further comprising:
   a turbulator or a vortex generator arranged within the flow path upstream of the flow electrification sensor.

10. The system of claim 1, wherein the signal processor is configured to:
    determine a fluid conductivity measurement with respect to the fluid based on a comparison of a first electrical potential at the static charge accumulator and a second electrical potential at the reference sensor.

11. A method, comprising:
    flowing a fluid through a flow path and over a flow electrification sensor at least partially contained within the flow path, the flow electrification sensor comprising a static charge accumulator and an insulator arranged such that the static charge accumulator interacts with the fluid;
    accumulating an electrical potential on the static charge accumulator;
    generating a sensor output signal corresponding to the electrical potential of the static charge accumulator;
    generating a reference output signal corresponding to an electrical potential of the fluid or of a ground;
    receiving the sensor output signal and the reference output signal with a signal processor; and
    comparing the sensor output signal and the reference output signal.

12. The method of claim 11, wherein the sensor output signal and the reference output signal are voltages.

13. The method of claim 11, wherein the sensor output signal and the reference output signal are currents.

14. The method of claim 11, wherein the reference output signal corresponds to the electrical potential of the fluid.

15. The method of claim 11, wherein the flow electrification sensor is a first flow electrification sensor, wherein comparing the sensor output signal and the reference output signal produces a first fluid conductivity measurement, and wherein the method further comprises:
    flowing a fluid through a flow path and over a second flow electrification sensor at least partially contained within the flow path, the flow electrification sensor comprising a second static charge accumulator and a second insulator arranged such that the second static charge accumulator interacts with the fluid;
    accumulating an electrical potential on the second static charge accumulator;
    generating a second sensor output signal corresponding to the electrical potential of the second static charge accumulator;
    receiving the second sensor output signal with the signal processor;
    comparing the second sensor output signal and the reference output signal, thereby producing a second fluid conductivity measurement; and
    comparing the first fluid conductivity measurement and the second fluid conductivity measurement.

16. The method of claim 11, wherein the flow path comprises a portion of a wellbore penetrating a subterranean formation.

17. The method of claim 16 further comprising:
    monitoring the comparison of the sensor output signal and the reference output signal over a period of time.

18. The method of claim 17 further comprising:
    performing a remedial operation to a portion of the subterranean formation in response to a change in the comparison of the sensor output signal and the reference output signal over the period of time.

19. The method of claim 11, wherein comparing the sensor output signal and the reference output signal comprises:
    comparing the electrical potential of the static charge accumulator to the electrical potential of the reference to determine a fluid conductivity measurement with respect to the fluid.

20. A method, comprising:
    flowing a fluid through a flow path and a first and a second flow electrification sensor at least partially contained within the flow path, each flow electrification sensor comprising a static charge accumulator and an insulator arranged such that the static charge accumulator interacts with the fluid,
    wherein the flow path extends into a wellbore penetrating a subterranean formation, and
    wherein the first flow electrification sensor is located along the flow path upstream of a first producing portion of the subterranean formation and downstream of a second producing portion of the subterranean formation, and
    wherein the second flow electrification sensor is located along the flow path upstream of the first producing portion of the subterranean formation and the second producing portion of the subterranean formation;
    accumulating an electrical potential on the static charge accumulator of each of the first and the second flow electrification sensors;
    generating a first and a second sensor output signal corresponding to the electrical potential of the static charge accumulator of the first and the second flow electrification sensors, respectively;

generating a reference output signal corresponding to an electrical potential of the fluid;

receiving the first and second sensor output signals and the reference output signal with a signal processor;

comparing the first sensor output signal and the reference output signal, thereby producing a first fluid conductivity measurement;

comparing the second sensor output signal and the reference output signal, thereby producing a second fluid conductivity measurement; and comparing the first fluid conductivity measurement and the second fluid conductivity measurement.

\* \* \* \* \*